United States Patent
Rivera et al.

(10) Patent No.: US 12,556,919 B2
(45) Date of Patent: Feb. 17, 2026

(54) CERTIFICATE ENROLLMENT SYSTEM AND METHOD FOR NON-VIRTUAL MACHINE BASED NETWORK ELEMENT

(71) Applicant: RAKUTEN MOBILE, INC., Tokyo (JP)

(72) Inventors: Francesca Rivera, Tokyo (JP); Ritesh Kumar Kalle, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 341 days.

(21) Appl. No.: 17/791,268

(22) PCT Filed: Apr. 13, 2022

(86) PCT No.: PCT/US2022/024596
§ 371 (c)(1),
(2) Date: Jul. 7, 2022

(87) PCT Pub. No.: WO2023/154070
PCT Pub. Date: Aug. 17, 2023

(65) Prior Publication Data
US 2024/0214807 A1    Jun. 27, 2024

Related U.S. Application Data

(60) Provisional application No. 63/309,877, filed on Feb. 14, 2022.

(51) Int. Cl.
*H04L 29/06* (2006.01)
*H04W 12/069* (2021.01)

(52) U.S. Cl.
CPC ................................ *H04W 12/069* (2021.01)

(58) Field of Classification Search
CPC .. H04W 12/069; H04L 63/0823; H04L 63/20; H04L 9/3263; H04L 9/3265; H04L 9/3268
See application file for complete search history.

(56) References Cited

U.S. PATENT DOCUMENTS 11,258,794 B2    2/2022    Adiga et al.
11,563,590 B1 *  1/2023    Bowen ............... H04L 9/3247
(Continued)

OTHER PUBLICATIONS

Written Opinion of the International Searching Authority dated Aug. 18, 2022 in International Application No. PCT/US2022/024596.
(Continued)

*Primary Examiner* — Joseph P Hirl
*Assistant Examiner* — Chi D Nguy
(74) *Attorney, Agent, or Firm* — Sughrue Mion, PLLC

(57) ABSTRACT

A system for performing full-automated enrollment of certificates in a mobile communications network, includes: a network element configured to request a certificate; at least one server configured to authenticate the network element and provide certificate authority (CA) information to the network element; and a certificate manager configured to obtain a preconfigured policy for the requested certificate, obtain the certificate based on the preconfigured policy, and issue the certificate to the network element, wherein the network element is configured to: send, to the at least one server, a request for obtaining information on the certificate manager; obtain, from the at least one server, the information on the certificate manager; send, to the certificate manager based on the obtained information on the certificate manager, a certificate signing request (CSR) for requesting the certificate; and receive, from the certificate manager, the requested certificate generated by a CA server of the certificate manager.

18 Claims, 8 Drawing Sheets

(56) References Cited

U.S. PATENT DOCUMENTS

| | | | |
|---|---|---|---|
| 11,870,768 B1* | 1/2024 | Vishwakarma | H04W 8/26 |
| 2003/0219129 A1 | 11/2003 | Whelan et al. | |
| 2006/0075219 A1* | 4/2006 | Callaghan | H04L 63/166 |
| | | | 713/156 |
| 2019/0324419 A1* | 10/2019 | Lutz | H04L 9/3263 |
| 2023/0179429 A1* | 6/2023 | Rosenthol | H04L 9/321 |
| | | | 713/156 |

OTHER PUBLICATIONS

International Search Report dated Aug. 18, 2022 in International Application No. PCT/US2022/024596.
Abdalla et al., "Toward Next Generation Open Radio Access Networks—What O-RAN Can and Cannot Do!", IEEE Network Magazine, Mar. 2022, pp. 1-8 (8 pages total).

\* cited by examiner

CERTIFICATE ENROLLMENT SYSTEM AND METHOD FOR NON-VIRTUAL MACHINE BASED NETWORK ELEMENT

CROSS REFERENCE TO RELATED APPLICATIONS

This application is a National Stage of International Application No. PCT/US2022/024596 filed Apr. 13, 2022, claiming priority based on U.S. Provisional Application No. 63/309,877 filed Feb. 14, 2022.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based). Thus, the traditional network architecture which is designed to support NEs provided by a specific vendor is no longer suitable. Further, since the number of parties involved in the network is increasing, securing network communication via traditional methods of authenticating and verifying vendor-specific NEs is no longer suitable in the multi-vendor environment.

In view of the above, there is a need to provide a system which supports deployment of multiple types of NEs. To this end, there is a need to provide a system which can efficiently and securely authenticate NEs provided by different vendors, to thereby provide a secure connection between the NEs.

SUMMARY

According to example embodiments, systems and methods are provided that allow for non-virtual machine (VM) based network elements (NEs) in a radio access network (RAN) to perform certificate enrollment via a Certificate Authority (CA) server.

According to example embodiments, systems and methods are provided that allow for fully automated enrollment of certificates for non-VM based NEs in the RAN, and that allow for semi-automated enrollment of certificates for non-VM based NEs in the RAN.

According to example embodiments, systems and methods are provided that securely authenticate a NE and securely provide information of a CA server to the NE.

According to example embodiments, systems and methods are provided that enable different types of NEs from one or more vendors to enroll certificates from one CA server.

According to example embodiments, systems and methods are provided that allow for semi-automated enrollment of certificates as a fallback certificate enrollment method, e.g., where a component for a fully automated enrollment fails or where a particular NE does not support auto-enrollment.

According to example embodiments, a system for performing full-automated enrollment of certificates in a mobile communications network, includes: a network element configured to request a certificate; at least one server configured to authenticate the network element and provide certificate authority (CA) information to the network element; and a certificate manager configured to obtain a preconfigured policy for the requested certificate, obtain the certificate based on the preconfigured policy, and issue the certificate to the network element, wherein the network element is configured to: send, to the at least one server, a request for obtaining information on the certificate manager; obtain, from the at least one server, the information on the certificate manager; send, to the certificate manager based on the obtained information on the certificate manager, a certificate signing request (CSR) for requesting the certificate; and receive, from the certificate manager, the requested certificate generated by a CA server of the certificate manager.

The at least one server may include a Dynamic Host Configuration Protocol (DHCP) server and an Authentication server; and the DHCP server may be configured to: receive the request for obtaining information on the certificate manager, sent by the network element, the request including at least one security parameter; send the at least one security parameter to the Authentication server to perform an authentication of the network element; receive a result of the authentication from the Authentication server; and send, to the network element, the information on the certificate manager based on the result of the authentication indicating a successful authentication.

The at least one security parameter may include a device certificate pre-installed at both the network element and the Authentication server; and the Authentication server may be configured to perform the authentication by verifying, using the device certificate pre-installed therein, the device certificate included in the at least one security parameter.

The device certificate may be a vendor certificate issued by a CA of a vendor of the network element, and the Authentication server may be configured to store a plurality of vendor certificates respectively issued by a plurality of CAs of vendors of network elements included in the mobile communications network.

The certificate manager may include a Registration Authority (RA) server and the CA server; the RA server may be configured to: receive the CSR sent by the network element and authenticate the network element, assign a predetermined profile identifier (ID) to the CSR, and send the CSR and the profile ID to the CA server; and the CA server may be configured to: receive the CSR and the profile ID sent by the RA server; determine a preconfigured policy mapped to the profile ID; and generate the certificate according to the determined preconfigured policy.

The information on the certificate manager may include at least one of a fully qualified domain name (FQDN) and port of the CA server.

The system may further include a Certificate Lifecycle Management System (CLMS) configured to communicate with the CA server to perform semi-automated enrollment of certificates from the CA server.

The system may further include another network element configured to generate and input another CSR to the CLMS, and download, via the CLMS, another certificate generated by the CA server, wherein the CLMS may be configured to: provide a graphical user interface (GUI) via which the CA server is selected from among a plurality of CA servers, and via which the other CSR is input; transmit the other CSR to the CA server; receive the other certificate generated by the CA server based on the transmitted other CSR; and allow the other certificate to be downloaded by the other network element.

The CA server may be configured to: receive the other CSR transmitted by the CLMS; determine a profile ID corresponding to the other CSR; determine a preconfigured policy mapped to the profile ID; and generate the other certificate based on the determined preconfigured policy.

The semi-automated enrollment of certificates may be provided by the system as an alternative to the full-automated enrollment when the full-automated enrollment cannot be performed for one or more network elements.

According to example embodiments, a method for performing full-automated enrollment of certificates in a mobile communications network, includes: sending, by a network element to at least one server, a request for obtaining information on a certificate manager; obtaining, by the network element from the at least one server, the information on the certificate manager based on the network element being authenticated by the at least one server; sending, by the network element to the certificate manager based on the obtained information on the certificate manager, a certificate signing request (CSR) for requesting the certificate; and receiving, by the network element from the certificate manager, the requested certificate generated by a CA server of the certificate manager based on a preconfigured policy obtained by the CA server for the requested certificate.

The method may further include: receiving, by a DHCP server among the at least one server, the request for obtaining information on the certificate manager, sent by the network element, the request including at least one security parameter; sending, by the DHCP server, the at least one security parameter to an Authentication server to perform an authentication of the network element; receiving, by the DHCP server, a result of the authentication from the Authentication server; and sending, by the DHCP server to the network element, the information on the certificate manager based on the result of the authentication indicating a successful authentication.

The at least one security parameter may include a device certificate pre-installed at both the network element and the Authentication server; and the method may further include performing, by the Authentication server, the authentication by verifying, using the device certificate pre-installed therein, the device certificate included in the at least one security parameter.

The device certificate may be a vendor certificate issued by a CA of a vendor of the network element, and the Authentication server may be configured to store a plurality of vendor certificates respectively issued by a plurality of CAs of vendors of network elements included in the mobile communications network.

The method may further include: receiving, by a Registration Authority (RA) server included in the certificate manager, the CSR sent by the network element and authenticating, by the RA server, the network element; assigning, by the RA server, a predetermined profile identifier (ID) to the CSR; sending, by the RA server, the CSR and the profile ID to the CA server; determining, by the CA server based on the CA server sent by the RA server, a preconfigured policy mapped to the profile ID; and generating, by the CA server, the certificate according to the determined preconfigured policy.

The information on the certificate manager may include at least one of a fully qualified domain name (FQDN) and port of the CA server.

The method may further include communicating, by a Certificate Lifecycle Management System (CLMS) for performing semi-automatic enrollment of certificates, with the CA server.

The method may further include: providing, by the CLMS, a graphical user interface (GUI) via which the CA server is selected from among a plurality of CA servers, and via which another CSR is input; generating and inputting, by another network element, the other CSR to the CLMS; transmitting, by the CLMS, the other CSR to the CA server; receiving, by the CLMS, another certificate generated by the CA server based on the transmitted other CSR; and downloading, by the other network element, the other certificate from the CLMS.

The method may further include: receiving, by the CA server, the other CSR transmitted by the CLMS; determining, by the CA server, a profile ID corresponding to the other CSR; determining, by the CA server, a preconfigured policy mapped to the profile ID; and generating, by the CA server, the other certificate based on the determined preconfigured policy.

According to example embodiments, a non-transitory computer-readable recording medium has recorded thereon instructions executable by at least one processor of a network element to cause the at least one processor to perform a method for full-automated enrollment of certificates in a mobile communications network, the method including: sending, to at least one server, a request for obtaining information on a certificate manager; obtaining, from the at least one server, the information on the certificate manager based on the network element being authenticated by the at least one server; sending, to the certificate manager based on the obtained information on the certificate manager, a certificate signing request (CSR) for requesting the certificate; and receiving, from the certificate manager, the requested certificate generated by a CA server of the certificate manager based on a preconfigured policy obtained by the CA server for the requested certificate.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
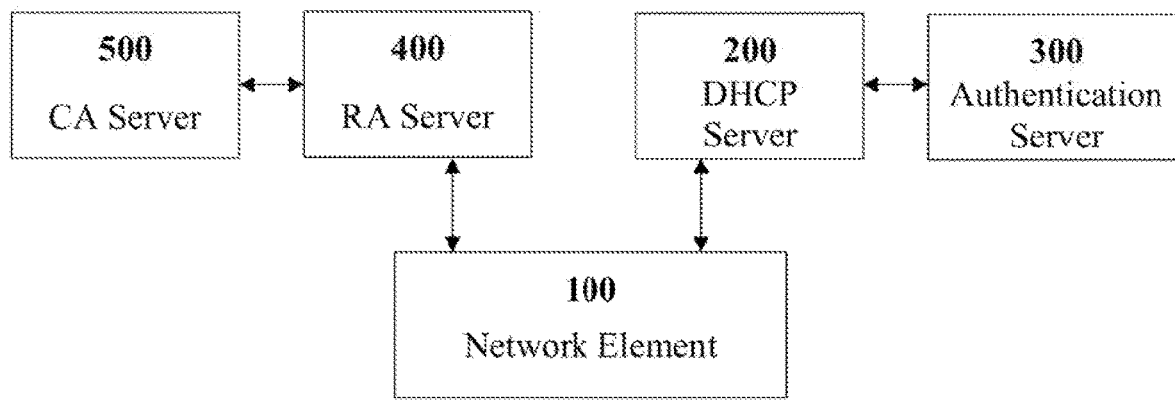
FIG. 1 is a block diagram of a system for performing fully automated certificate enrollment for non-virtual machine (VM) based network elements of a mobile communications network, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code.—It is being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a zero-trust, automated mutual authentication of network elements (NEs) in a radio access network (RAN). In this regard, zero-trust refers to a principle of "never trust, always verify," while mutual authentication refers to authenticating two entities with each other to set up a secure connection therebetween. For example, according to embodiments, any time a NE (e.g., a radio unit (RU), centralized unit (CU), distribution unit (DU), etc.) would like to establish a connection with another NE, both NEs would enroll certificates from a Certificate Authority (CA) server and use the certificates to authenticate each other, thereby securing the connection.

Example embodiments of the present disclosure provide a fully-automated method of enrolling certificates for non-virtual machine (VM) based NEs (e.g., hardware-based physical NEs) and a system for performing the same, said method including: using a Dynamic Host Configuration Protocol (DHCP) server and an Authentication server to authenticate the NE and to provide information of a Certificate Authority (CA) server (such that the NE can generate a certificate signing request (CSR) and send the CSR to the CA server based on the provided information), using a Registration Authority (RA) server such as an Enrollment over Secure Transport (EST) server to assign a profile identifier (ID) to the CSR and to forward the CSR along with the profile ID to the CA server (so as to secure the connection between the NE and the CA server), and using the CA server to map a policy corresponding to the CSR based on the profile ID and to generate or obtain a certificate based on the determined policy. Because the enrollment is fully-automated in example embodiments, a user need not manually provide information (e.g., information on the CA server, policy information, CSR parameters, etc.) to enroll the certificate (e.g., at the time of enrolling, re-enrolling, or renewing the certificate), thereby reducing a burden on network operators as well as the risk of information leakage (e.g., due to human error).

Example embodiments of the present disclosure provide a semi-automated method of enrolling certificates for non-VM based NEs and a system for performing the same, said method including: using a Certificate Lifecycle Management System (CLMS) to allow a user to input a CSR for a non-VM based NE via a graphical user interface (GUI) and to enroll the CSR to a CA server; and using the CA server to assign a policy ID and map a policy corresponding to the CSR based on the policy ID, and to generate a certificate based thereon and send the same to the CLMS. According to example embodiments, a user can then download the certificate to the non-VM based NE via the CLMS. Further, according to example embodiments, a user can use the GUI of the CLMS to select a CA server via which the certificate will be enrolled.

In one or more example embodiments, the system and method for semi-automated enrollment of certificates may be provided in addition to the fully-automated method described above. As a result, example embodiments allow NEs which do not support certificate auto-enrollment to be deployed along with NEs that do support certificate auto-enrollment, thereby allowing greater flexibility in configuring a network system (i.e., allowing the network system to support more types of NEs from the same or different vendors). Additionally, by including the CLMS and the semi-automated method for enrolling certificates, example embodiments provide a fallback or backup certificate enrollment process in situations where auto-enrollment or auto-renewal cannot be performed (e.g., DHCP failure, Authentication Server failure, RA server failure, etc.). As a result, network stability is improved and the impact of a system component's failure is reduced.

Example embodiments of the present disclosure provide a system and method of enrolling certificates for non-VM based NEs, that uses an Authentication server distinct from a DHCP server to authenticate a NE (e.g., verify the NE's security parameters included with a DHCP request). As a result, in one or more example embodiments, the DHCP server does not need to store the parameters for the authentication or verification process (e.g., vendor's certificates, etc.), thereby reducing the load of the DHCP server. Further, since the DHCP server does not need to store the authentication or verification parameters, one DHCP server can provide CA information to multiple NEs from different vendors and/or of different types (e.g., O-RU, subscriber terminal unit (STU), radio interface unit (RIU), etc.). For example, in an O-RAN based telecommunications system according to example embodiments, NEs from a large number of vendors may be included. In order to authenticate all the NEs, a large amount of corresponding authentication information (e.g., vendor certificates, etc.) would need to be pre-installed. If such information were stored in the DHCP server, the load of the DHCP server would be increased (i.e., more data storage and processing power would be used), as would the cost. By offloading the authentication to a distinct authentication server in one or more embodiments, scalabilty of the system improves and load on the DHCP server is reduced.

According to example embodiments, systems and methods are provided that assign a profile ID to each CSR, map a corresponding policy to the profile ID, and generate a certificate based on the policy. Since the CA server generates certificates based on corresponding policies, the system is able to support operator (e.g., telco or mobile network operator) certificate enrollment for multiple types of NEs (where different types of NEs would have different policies) using one CA server. By using one CA server (or reducing the number of CA servers), implementation cost and network construction time are reduced, as well as overall network power consumption (in view of the reduced number of CA servers).

FIG. 1 is a block diagram of a system for performing fully automated certificate enrollment for non-VM based network elements of a mobile communications network, according to one or more embodiments. Referring to FIG. 1, the system includes a network element 100, a DHCP server 200, an Authentication server 300, a Registration Authority (RA) server 400, and a Certificate Authority (CA) server 500.

The network element (NE) 100 may be any network element included in the mobile communications (i.e., telecommunications) network (e.g., 5th Generation (5G) mobile network, Long-Term Evolution (LTE) network, etc.). For example, the NE 100 may be an RU, a STU, a RIU, etc. Further, the network may be an Open RAN (O-RAN) based network, and the NE 100 may be an O-RAN based NE (e.g., an O-RU, etc.). To this end, the NE 100 may be any of plural types and from any of plural vendors. As will be described in further detail below, the NE 100 is configured to obtain information (e.g., address, etc.) of the CA server 500 from the DHCP server 200, generate a certificate signing request (CSR), send the certificate signing request toward the CA server 500 based on the obtained information, and receive a certificate generated by the CA server 500 based on the CSR. Using the certificate, the NE 100 may perform secure communication in the network, e.g., with another non-VM based NE or a VM-based NE (such as CU, DU, etc.).

The DHCP server 200 is configured to provide and assign an Internet Protocol (IP) address to the NE 100 and to provide the information of the CA server 500 to the NE 100. Here, the DHCP server 200 provides the IP address and the information of the CA server 500 based on the NE 100 being verified and/or authenticated by the Authentication server 300. The information of the CA server 500 may include at least one of identification information of the CA server 500 (e.g., fully qualified domain name (FQDN)), an address of the CA server (e.g., IP address), and a security parameter for the CA server 500 (e.g., root certificate of CA server 500).

The Authentication server 300 is configured to authenticate the NE 100. Further, the Authentication server 300 includes a storage that stores security parameters for authenticating or verifying the NE 100. For example, vendor certificates (or third-party certificates) for a plurality of vendors of Network Elements in the mobile communications network are pre-installed in the Authentication server 300. In this case, the Authentication server 300 receives security parameters from the NE 100 (e.g., the NE's vendor device certificate, signed parameter such as serial number and/or nonce, vendor identifier, etc.), and checks whether the received security parameters are correct using the NE vendor's certificate pre-installed therein. Here, the security parameters may be transmitted by the NE 100 to the DHCP server 200 with a DHCP request (e.g., DHCPv6 Request message). Additionally, according to one or more example embodiments, one or more operator certificates (e.g., root certificate from the network operator's root CA) different from the certificate being enrolled by the NE 100 (e.g., intermediate certificate) may be pre-installed in the Authentication server 300 in addition to (or instead of) the vender certificates. In this case, the Authentication server 300 can authenticate the NE 100 using either an operator device certificate (e.g., root certificate previously issued to NE 100 from operator's root CA) or a vender (or third-party) device certificate (e.g., device certificate pre-installed or previously issued to NE 100 from NE vendor's CA) received from the NE 100.

The RA server 400 is configured to receive the CSR from the NE 100, authenticate or validate the NE 100, and forward the CSR to the CA server 500. For example, the RA server 400 may validate the NE 100 based on information included in or with the CSR (e.g., vendor certificate, third-party certificate, operator root certificate, etc.) and information preinstalled in the RA server 400 (e.g., vendor certificate, third-party certificate, operator root certificate, etc.). According to example embodiments, the RA server 400 may be an EST server that establishes a secured connection between the NE 100 and the CA server 500 based on the EST protocol (i.e., as defined in RFC 7030). For example, the NE 100 may send a vendor certificate (i.e., certificate issued by NE vendor's CA) with the CSR and/or in response to a Transport Layer Security (TLS) certificate request message to the EST server, and the EST server will verify the vendor certificate and authorize the CSR accordingly. It is understood that the EST server is merely an example, and one or more other embodiments are not limited thereto. For example, the RA server 400 in various other embodiments may implement a different security protocol for certificate provisioning, including without limitation Simple Certificate Enrollment Protocol (SCEP), Certificate Management Protocol (CMP), Certificate Management over Cryptographic Message Syntax (CMC), etc.

Further, according to example embodiments, the RA server 400 (e.g., EST server) is configured to assign or map a profile ID to the CSR, and forward the CSR (i.e., authorized CSR) and (e.g., together with) the profile ID to the CA server 500. The RA server 400 may be previously configured with correspondences between a plurality of NEs in the network and a plurality of profile IDs. For example, the RA server 400 may include or store a list or mapping of profile IDs to at least one of NE device types (e.g., RU, CU, DU, etc.), preinstalled vendor certificates, vendor identifications, NE device identifiers (e.g., serial number), etc. By way of example, the RA server 400 may include a list of preinstalled vendor certificates, each of which has a corresponding profile ID. By way of another example, the RA server 400 may include a list of devices (NEs) or device types to be enrolled to the CA server 500, each of which has a corresponding profile ID previously assigned thereto. Here, the profile IDs may be manually assigned by a user (e.g., a system administrator) when there is a new device that is to be enrolled to the CA server 500 or installed in the network. Specifically, when a new device is to be enrolled to the CA server 500 in order to obtain certificates, a user may assign a profile ID for that device and configure a corresponding policy for that device/profile ID in the CA server 500 (e.g., may define a key usage, a key validity period, etc.). The profile ID may be uniquely assigned to that NE 100 (e.g., NE serial number), or may be the same profile ID assigned to other NEs (e.g., other NEs of the same at least one of type, purpose, vendor, etc.). In the latter case, a new policy would not need to be configured for the NE, as it would already be set for that profile ID. Additionally, in one or more embodiments, the corresponding policy may be previously configured and set in the CA server 500 for a range of profile IDs (both assigned and unassigned), e.g., a particular policy for a particular type of NE (such as RU or STU) may be preconfigured for a range of profile IDs that correspond to that type of NE (e.g., 6000-6999 for RUs, 7000-7999 for STUs, etc.). In this case, upon assigning a unique profile ID to the device (e.g., a new RU to be added to the network), the corresponding policy need not be configured at that time as it is already pre-configured and mapped to a range of profile IDs including the newly-assigned profile ID.

The CA server 500 is configured to receive the CSR from the RA server 400, generate a certificate based on the CSR, and provide the certificate to the NE 100 (i.e., via the RA server 400). According to example embodiments, the CA server 500 is configured to receive the CSR and the profile ID from the RA server 400 (e.g., EST server), and map a corresponding policy (i.e., predetermined or predefined policy) to the CSR according to the profile ID. The CA server may store a list of profile IDs (i.e., previously set profile IDs), each of which corresponds to a specific NE (e.g., NE serial number), a specific type of NE, a particular vendor, etc. For example, a first ID or a first set of IDs (e.g., "6xxx") correspond to a first type of NE (e.g., RUs), a second ID or a second set of IDs (e.g., "7xxx") correspond to a second type of NE (e.g., STUs), etc. The CA server 500 may also store a plurality of policies, each of which corresponds to a profile ID or to a type of NE. The policies may be preconfigured by a user (e.g., administrator) via a graphical user interface that includes various user input fields (e.g., validity period and validity period options, key usage, revocation parameters, etc.) for defining the policy. The CA server 500 may then determine the policy corresponding to the profile ID for the CSR, and generate the certificate in accordance with the determined policy. In this case, the generated certificate may include the key usage, validity period, etc., such that the certificate will only allow the NE 100 to perform the specified usage within the validity period.

As set forth above, the policies include information for configuring or generating a certificate, such as at least one of a subject name format (C, O, CN fields), a key usage (e.g., digital signature, key certificate signing, certificate revocation list signing, etc.), an extended key usage, a validity period, revocation information etc. The policies may be defined based on NE type (e.g., a default or standard validity period for an RU may be 6 months, and a default or standard validity period for a non-RU device may be 3 years), though it is understood that one or more other embodiments are not limited thereto and the policies may be defined in accordance with a user's (e.g., administrator's) desires, needs, etc. For example, a particular policy may be configured by a user with a relatively short validity period for a NE (i.e., profile ID of NE) that is being tested or test for certificate renewal.

Figure 2:
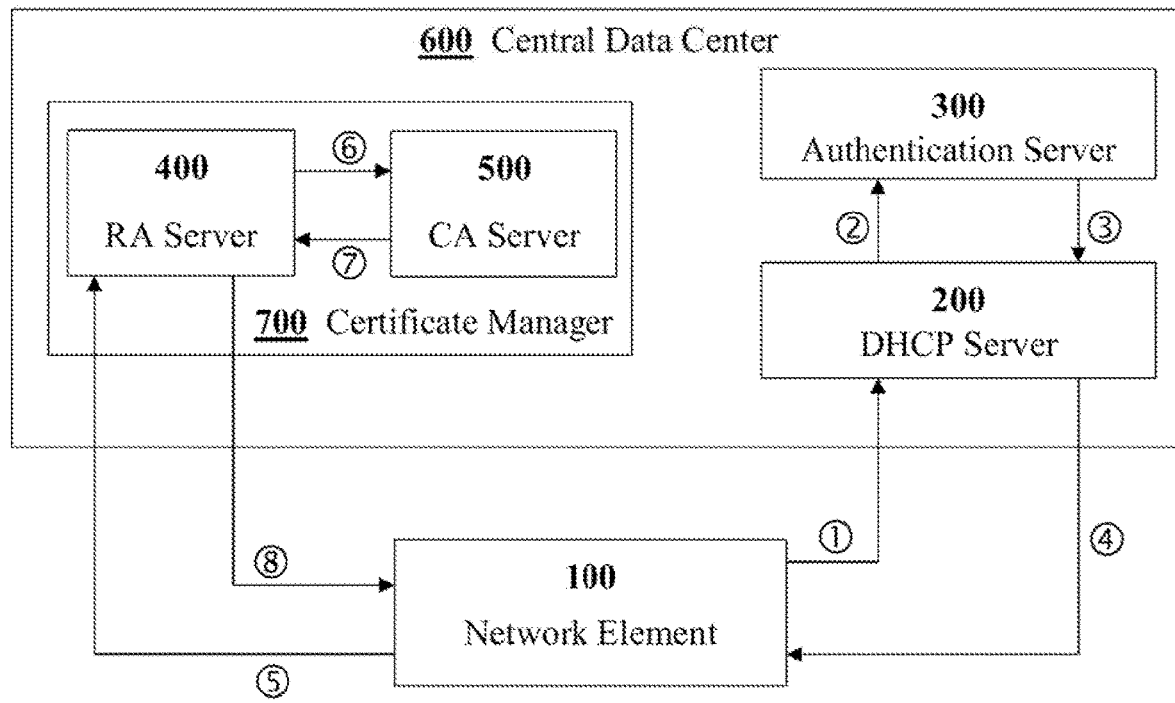
FIG. 2 is a diagram of a system architecture including a communication flow for performing fully automated certificate enrollment for non-VM based network elements of a mobile communications network, according to one or more embodiments.

FIG. 2 is a diagram of a system architecture including a communication flow for performing fully automated certificate enrollment for non-VM based network elements of a mobile communications network, according to one or more embodiments. Referring to FIG. 2, the system architecture includes a NE 100 and a central data center (CDC) 600. The CDC 700 may be a data center of an operator of the mobile communications network or telco, and includes a DHCP server 200, an Authentication server 300, and a certificate manager (CM) 700. It is understood that this is merely an example, and in other embodiments, at least some of the various devices may be distributed across multiple locations or data centers. The CM 700 includes an RA server 400 (e.g., EST server) and a CA server 500 (e.g., mobile network operator's CA server). The NE 100, DHCP server 200, Authentication server 300, RA server 400 and CA server 500 may be the same as or substantially similar to those described above with reference to FIG. 1, and redundant descriptions thereof may not be repeated below.

Referring to FIG. 2, at ①, the NE 100 sends a request (e.g., DHCP Request) to the DHCP server 200. The NE 100 sends the request in order to acquire an IP address and CA information from the DHCP server 200. The request may include at least one of identification information on a vendor of the NE 100, a serial number of the NE 100, an NE device certificate, a signed serial number, a signed nonce, etc. Here, the NE device certificate may be the NE's vendor device certificate (or vendor CA certificate) pre-installed in the NE 100, or an operator (e.g., mobile network operator or telco) device certificate (or operator CA certificate) that the NE 100 already has (e.g., root CA certificate). Further, the nonce may be previously received by the NE 100 from the DHCP server 200.

At ②, the DHCP server 200 sends (or forwards) security parameters of the NE 100 to the Authentication server 300 for verification and authentication. The security parameters may include at least one of the received serial number of the NE 100, the received NE device certificate, the received signed serial number, the received signed nonce, the nonce itself, etc.

The Authentication server 300 verifies and authenticates the received security parameters. For example, the Authentication server 300 verifies that the NE device certificate, the signed serial number, and the signed nonce are correct, using the corresponding vendor or operator certificate pre-installed therein, the received serial number, and the received nonce, respectively. At ③, the Authentication server 300 sends a result (e.g., success response or fail response) of the authentication and verification to the DHCP server 200.

At ④, based on the result of the authentication and verification indicating a successful authentication/verification, the DHCP server 200 generates and sends a message (e.g., DHCP Response message) to the NE 100, the message including the NE's IP address and information of the CA server 500 (e.g., FQDN/IP, Port). The message may also include Domain Name System (DNS) information, an operator CA root certificate, etc. In one or more example embodiments, a Top-of-Rack (TOR) switch or Transport Network Equipment (TNE) may be included in the communication path between the DHCP server 200 and the NE 100 and may forward messages therebetween.

At ⑤, the NE 100 sends a CSR and a device certificate (e.g., pre-installed vendor certificate) to the CM 700 based on the received information of the CA server 500. Here, the CSR generated by the NE 100 may include a public key (e.g., a public key generated by NE 100 to be included in the requested certificate), a common name field (e.g., device's hostname), and an organization name field (e.g., the mobile network operator's name), and may be signed with a private key corresponding to the included public key. The CSR and device certificate may be transmitted in an HTTP Request message.

The CSR and device certificate are received by the RA server 400 (e.g., EST server), which validates the NE 100. For example, the RA server 400 validates the NE 100 using the received device certificate and a corresponding device certificate (e.g., vendor certificate) pre-installed therein. The RA server 400 also assigns or maps a corresponding profile ID to the NE 100/CSR, as described above, and sends (or forwards) the CSR along with the profile ID to the CA server 500 at ⑥.

The CA server 500 receives the CSR along with the profile ID from the RA server 400, and determines a policy (e.g., previously configured policy) for the CSR based on the profile ID, as described above. The CA server 500 generates the certificate based on the CSR and the determined policy. The certificate may be formatted in accordance with a predefined standard, such as X.509. At ⑦, the CA server 500 sends the certificate to the RA server 400, which in turn sends it to the NE 100 at ⑧. The RA server 400 may send the certificate (e.g., CA signed device certificate) to the NE 100 in an HTTP Response message.

Figure 3:
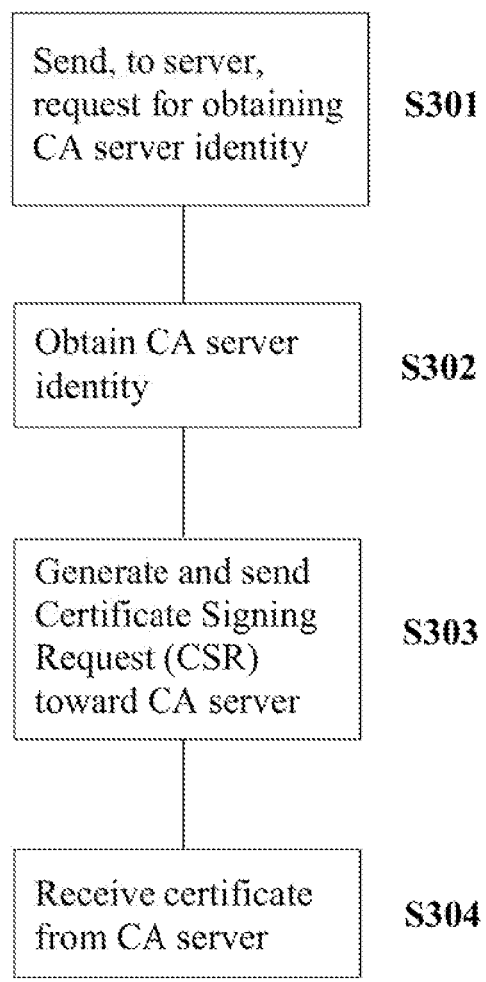
FIG. 3 is a flowchart of a method for performing fully automated certificate enrollment for non-VM based network elements, according to one or more embodiments.

FIG. 3 is a flowchart of a method for performing fully automated certificate enrollment for non-VM based network elements, according to one or more embodiments. The method of FIG. 3 may be performed by the NE 100 described above with reference to FIG. 1 or 2. For example, the method may be performed by at least one processor executing instructions stored in a memory.

Referring to FIG. 3, in operation S301, the NE 100 sends a request (e.g., DHCP request) to a first server (e.g., DHCP server 200) in order to obtain a CA server identity. The request may include at least one of identification information on a vendor of the NE 100, a serial number of the NE 100, an NE device certificate, a signed serial number, a signed nonce, etc. Here, the NE device certificate may be the NE's vendor device certificate (or vendor CA certificate) pre-installed in the NE 100, or an operator (e.g., mobile network operator or telco) device certificate (or operator CA certificate) that the NE 100 already has. Further, the nonce may be previously received by the NE 100 from the first server.

In operation S302, the NE 100 obtains a CA server identity from the server (e.g., DHCP server 200). For example, based on the non-VM NE being authenticated/verified, by the server or an Authorization server 300 communicably connected to the server (e.g., DHCP server 200), according to the NE device certificate, signed serial number, signed nonce, etc., the NE 100 receives the CA server identity (e.g., FQDN/IP, Port) from the server. The NE 100 may also receive an IP address and additional information (e.g., DNS, etc.) from the server.

The NE 100 generates and sends a CSR toward the CA server 500 at operation S303. Here, the CSR may be generated before, after, or concurrently with operation S301 in various embodiments. Further, in operation S303, the NE 100 may send the CSR with at least one security parameter (e.g., a device certificate such as a vendor certificate), in order to be authenticated. For example, the NE 100 may transmit the CSR and security parameter to the RA server 400 (e.g., EST server), which authenticates the NE 100 using the security parameter (and a corresponding security parameter that it possesses) and, in turn, forwards the CSR to the CA server 500.

The CA server 500 generates a certificate based on the CSR and, in operation S304, the NE 100 receives the generated certificate.

Figure 4:
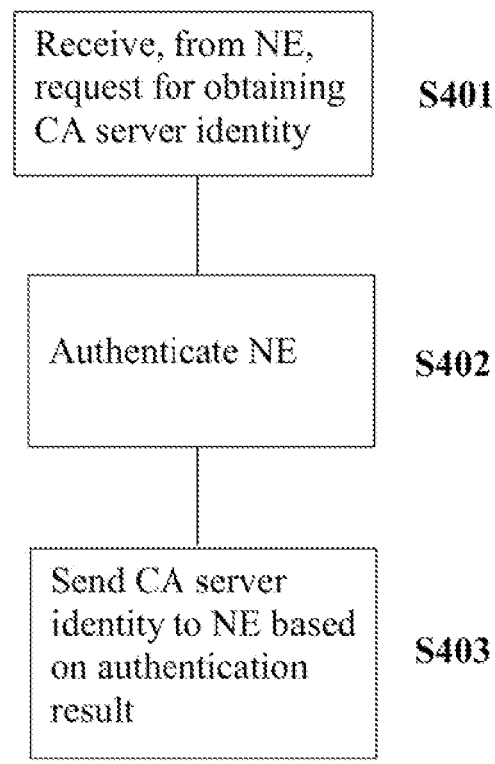
FIG. 4 is a flowchart of a method of providing a CA server identity to a non-VM NE according to one or more embodiments.

FIG. 4 is a flowchart of a method of providing a CA server identity to a non-VM NE according to one or more embodiments. The method of FIG. 4 may be performed by the DHCP server 200 described above with reference to FIG. 1 or 2, and may be performed in response to operation S301 in FIG. 3. For example, the method may be performed by at least one processor executing instructions stored in a memory.

Referring to FIG. 4, at operation S401, a server (e.g., DHCP server 200) receives a request for obtaining CA information (e.g., CA server identity) from a NE 100. The request may also be for receiving an IP address. The request may include at least one of identification information on a vendor of the NE 100, a serial number of the NE 100, an NE device certificate, a signed serial number, a signed nonce, etc. The nonce may be previously transmitted by the server to the NE 100 (e.g., in response to an initial message).

At operation S402, the server authenticates the NE 100 (e.g., determines whether NE 100 is authentic). For example, the server (e.g., DHCP server 200) may transmit one or more security parameters (e.g., received serial number, received NE device certificate, received signed serial number, received signed nonce, and nonce) to another server (e.g., Authentication server 300) which verifies the one or more security parameters (e.g., using a corresponding pre-installed certificate) and returns a result (e.g., success or fail) of the verification to the server. Alternatively, the server may directly authenticate the NE 100 itself (i.e., verify the one or more security parameters itself).

At operation S403, the server sends the CA server identity (e.g., FQDN/IP, Port) to the NE 100 based on the authentication/verification result. The server may also assign and send an IP address and additional information (e.g., DNS, etc.) to the NE 100 in operation S403.

Figure 5:
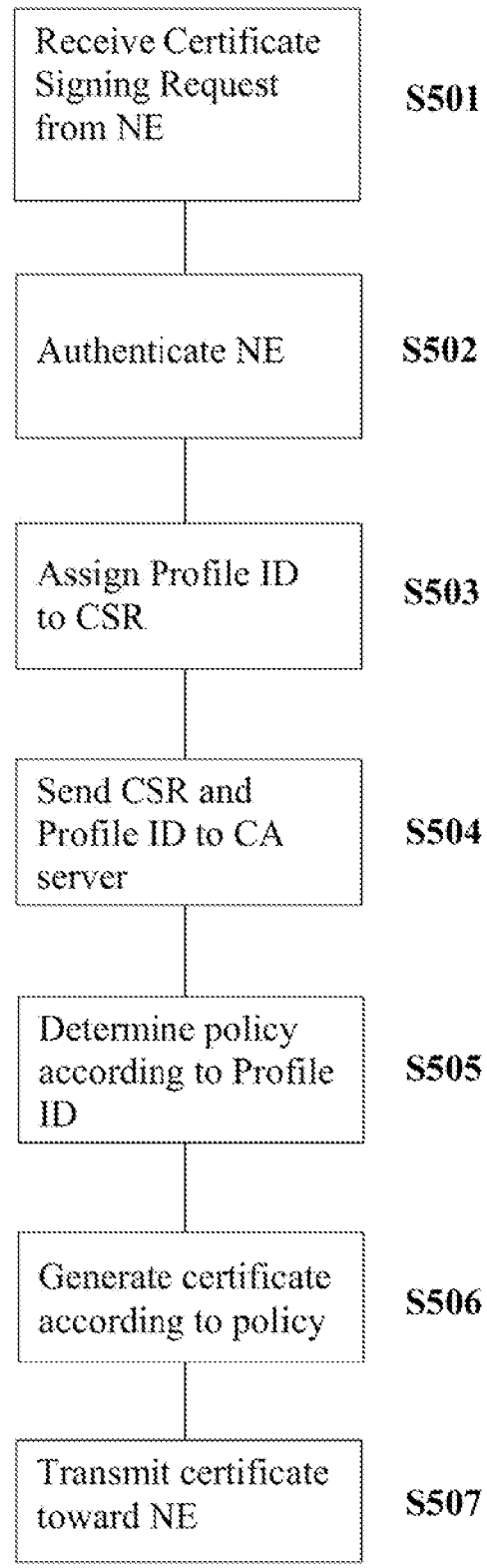
FIG. 5 is a flowchart of a method of generating a certificate according to one or more embodiments.

FIG. 5 is a flowchart of a method of generating a certificate according to one or more embodiments. The method of FIG. 5 may be performed by the CM 700 described above with reference to FIG. 2, and may be performed in response to operation S303 in FIG. 3. For example, the method may be performed by at least one processor executing instructions stored in a memory.

Referring to FIG. 5, in operation S501, a first server (e.g., RA server 400) receives a CSR from a NE 100. The CSR may include a public key (e.g., a public key generated by NE 100 to be included in the requested certificate), a common name field (e.g., device's hostname), and an organization name field (e.g., the mobile network operator's name), and may be signed with a private key corresponding to the included public key. The first server may also receive a device certificate (e.g., NE's vendor certificate) from the NE 100 in operation S501.

In operation S502, the first server authenticates the NE 100. For example, the first server may authenticate the NE 100 in accordance with a predefined protocol (e.g., EST protocol, SCEP, CMP, CMC protocol, etc.). To this end, a certificate corresponding to the device certificate received from the NE 100 may be pre-installed in the first server and used to verify the device certificate.

In operation S503, the first server maps or assigns a profile ID to the CSR 100. For example, the first server (e.g., RA server 400) may be previously configured with correspondences between a plurality of NEs in the network and a plurality of profile IDs. For example, the first server may include or store a list or mapping of profile IDs to at least one of NE device types (e.g., RU, CU, DU, etc.), preinstalled vendor certificates, vendor identifications, NE device identifiers, etc. By way of example, the first server may include a list of preinstalled vendor certificates, each of which has a corresponding profile ID. By way of another example, the first server may include a list of devices (NEs) or device types to be enrolled to the CA server 500, each of which has a corresponding profile ID previously assigned thereto.

In operation S504, the first server sends the CSR with the profile ID to a second server (i.e., the CA server 500).

In operation S505, the second server determines or maps a corresponding policy to the CSR according to the profile ID. Here, the policy is preconfigured and set in the second server, and includes information for configuring the certificate (e.g., at least one of a subject name format (C, O, CN fields), a key usage, an extended key usage, a validity period, etc.). For example, in operation S505, the second server may determine a device type of the NE 100 according to the profile ID, and may determine the preconfigured policy based on the device type.

In operation S506, the second server generates a certificate based on the CSR and the determined policy. The certificate may be formatted in accordance with a predefined standard, such as X.509, and may have values (e.g., validity period, key usage, etc.) based on the determined policy.

In operation S507, the second server (e.g., CA server 500) transmits the certificate toward the NE 100. For example, the second server may send the certificate to the first server (e.g., RA server 400), which in turn forwards it to the NE 100 (or to another device, e.g., TOR switch or TNE, which then sends it to the NE 100).

It is understood that the methods of FIGS. 3 through 5 may be performed automatically, i.e., without manual inputs or human intervention needed at the time of certificate enrollment (or re-enrollment, renewal, etc.).

Figure 6:
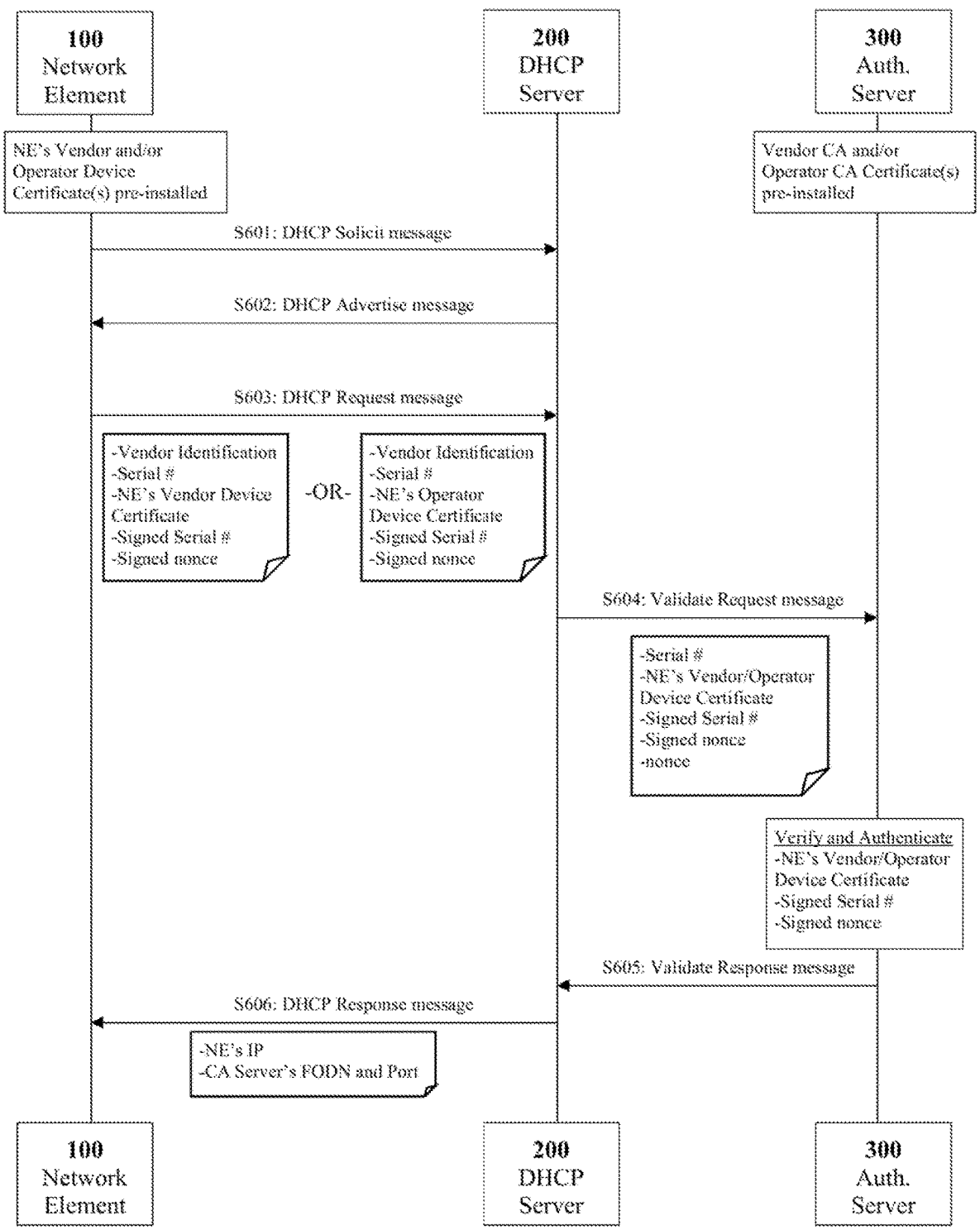
FIG. 6 is a message flow diagram for obtaining a CA server identity according to one or more embodiments.

FIG. 6 is a message flow diagram for obtaining a CA server identity according to an embodiment. The message flow diagram of FIG. 6 includes messages transmitted between a NE 100, DHCP server 200, and Authentication server 300, such as those described above with reference to FIG. 1. It is understood that one or more other embodiments are not limited to the message flow and system devices shown in FIG. 6. For example, in one or more other embodiments, a TOR switch or other TNE may be included between at least two of the devices (e.g., between the NE 100 and the DHCP server 200).

Referring to FIG. 6, at S601, the NE 100 sends a DHCP Solicit message to the DHCP server 200. In response, at S602, the DHCP server 200 transmits a nonce in a DHCP Advertise message to the NE 100. Here, the nonce may be generated by the DHCP server 100 (e.g., for a one-time use), for example, in response to receiving the DHCP Solicit message. The NE 100 generates and sends a DHCP Request message to the DHCP server 200 at S603, the DHCP Request message including vendor information, the NE's serial number, the NE's device certificate, the signed serial number, and the signed nonce. Here, the DHCP Request message may either include the NE's vendor device certificate pre-installed in the NE 100 (which may be referred to as an invalid operator device certificate), or an operator (e.g., mobile network operator or telco) device certificate (or operator CA certificate) that the NE 100 already has (which may be referred to as a valid operator device certificate), e.g., a root certificate from the operator's CA. The DHCP server 200 sends the security parameters (serial number, device certificate, signed serial number, signed nonce, and nonce) in a Validate Request message to the Authentication server 300 at S604. The Authentication server 300 verifies the device certificate using a corresponding vendor or operator CA certificate pre-installed therein, and verifies the signed serial number and signed nonce. Based on the verification, the Authentication server 300 transmits a Validate Response message indicating success or fail to the DHCP server 200 at S605. Based on the Validate Response message indicating success, the DHCP server 200 sends a DHCP Response to the NE 100 at S606. The DHCP Response received by the NE 100 includes the NE's IP address and the CA Server's information (e.g., the CA Server's FQDN, Port, and/or IP). Further, the DHCP Response may include additional information, such as at least one of the operator CA root certificate, DNS and other details, etc.

Figure 7:
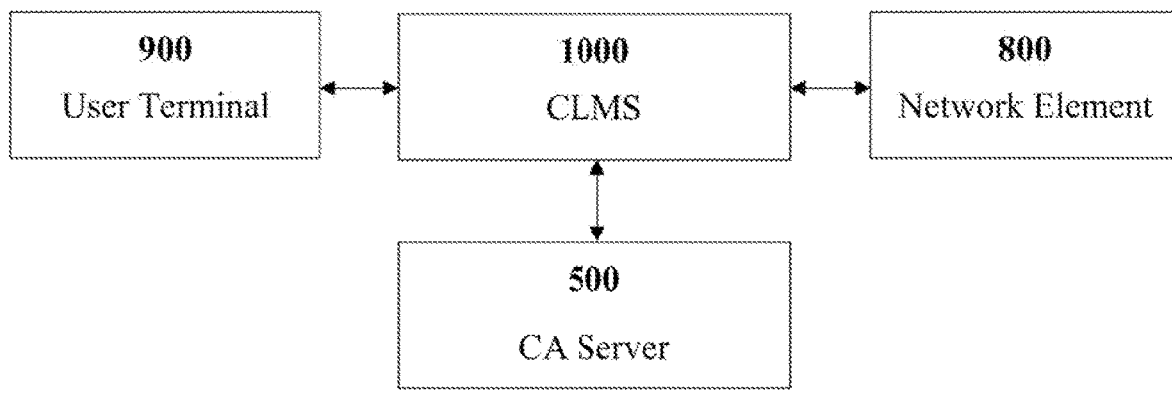
FIG. 7 is a block diagram of a system for performing semi-automated certificate enrollment for non-virtual machine (VM) based network elements of a mobile communications network, according to one or more embodiments.

FIG. 7 is a block diagram of a system for performing semi-automated certificate enrollment for non-virtual machine (VM) based network elements of a mobile communications network, according to one or more embodiments. Referring to FIG. 7, the system includes a network element (NE) 800, a user terminal 900, a Certificate Lifecycle Management System (CLMS) 1000, and a Certificate Authority (CA) server 500.

The NE 800 may be any network element included in the mobile communications (i.e., telecommunications) network (e.g., 5G mobile network, LTE network, etc.). For example, the NE 800 may be an RU, a STU, a RIU, etc. Further, the network may be an Open RAN (O-RAN) based network, and the NE 800 may be an O-RAN based NE (e.g., an O-RU, etc.). To this end, the NE 800 may be any of plural types and from any of plural vendors. The NE 800 is configured to connect to the CLMS 1000, generate and upload a CSR to the CLMS 1000, and download and install a certificate (e.g., mobile network or telco operator device certificate) (e.g., address, etc.) of the CA server 500 obtained via the CLMS 1000. The CSR may be input by a user (e.g., owner of the NE 800, system or network administrator, etc.) to a graphical user interface (GUI) provided by the CLMS for certificate enrollment. For example, the user may select a CA server (e.g., one of plural intermediate CAs for respectively signing or enrolling certificates of different types of NEs in the network) for enrolling the CSR via the GUI. The NE 800 may or may not support the fully-automated certificate enrollment as described above with reference to FIGS. 1-6. In one or more embodiments, the NE 800 may be unable to obtain the certificate via the fully-automated method described above with reference to FIGS. 1-6 (e.g., the NE 800 may not support fully-automated certificate enrollment, a component of the system for performing the full-automated certificate may experience a failure, etc.). Alternatively or additionally, the system itself may not support the fully-automated certificate enrollment or may itself be specifically configured for semi-automated certificate enrollment according to an embodiment of the present disclosure.

The user terminal 900 is configured to connect to the CLMS 1000 and receive and display a graphical user interface of the CLMS 1000. Further, the user terminal 900 includes an input device (e.g., at least one of keyboard, mouse, touch screen, etc.) through which a user may provide inputs to the user interface of the CLMS 1000. Specifically, the user terminal 900 may be configured to allow a user (e.g., administrator) to approve or deny a CSR uploaded by the network element 800 and to manage one or more parts of the lifecycle of certificates deployed across the network (e.g. O-RAN). For example, the user may manually revoke a certificate, modify a parameter or field of a certificate, view dashboards or information regarding deployed certificates, etc., via the graphical user interface of the CLMS 1000 displayed on the user terminal 900. The user terminal 900 may be any computing device (e.g., personal computer, laptop computer, workstation, mobile device, etc.).

The CLMS 1000 is a system (e.g., one or more servers or computing devices) for enrolling and managing the lifecycle of CA certificates in a network. As described above, the CLMS 1000 provides a GUI for certificate enrollment through which the NE 800 can upload a CSR. For example, a user (e.g., owner of the NE 800, administrator, etc.) may select a CA server via the GUI for certificate enrollment. Additionally, the CLMS 1000 may provide a GUI to a user terminal to allow a user (e.g., administrator) to approve or deny CSRs that have been uploaded or input to the CLMS 1000, view dashboards and information on certificates deployed throughout the network, and manage the lifecycles of deployed certificates. Additionally, the CLMS 1000 may check any CSR for compliance with a particular policy, e.g., an approved cryptography policy of the telco or mobile communications network operator, perform automatic certificate renewal, etc.

The CLMS 1000 is communicatively coupled or connected to the CA server 500 via an application programming interface (API), such as a Representational State Transfer (REST or RESTful) API, and submits or sends the CSR uploaded by the NE 800 to the CA server 500. Further, the CLMS 1000 may be configured to receive a notification from the CA server 500 when the certificate is ready to be downloaded, notify the user (e.g., owner of the NE 800 or administrator) that the certificate is ready to be downloaded, receive the certificate from the CA server 500, and allow the user to download the certificate to the NE 800.

The CA server 500 is configured to receive the CSR generated by the NE 800 from the CLMS 1000, determine a previously set (e.g., by a user) profile ID for the CSR (e.g., based on the NE 800 type or vendor), determine a corresponding policy mapped to the profile ID as discussed above with reference to FIGS. 1 and 2, and generate the certificate according to the CSR and the policy. Further, the CA server 500 is configured to send the certificate to the CLMS 1000 through which a user can download the certificate to the NE 800. In one or more embodiments, the CA server 500 may be further configured to send a notification to the CLMS to notify the user that the certificate is ready to be downloaded.

Figure 8:
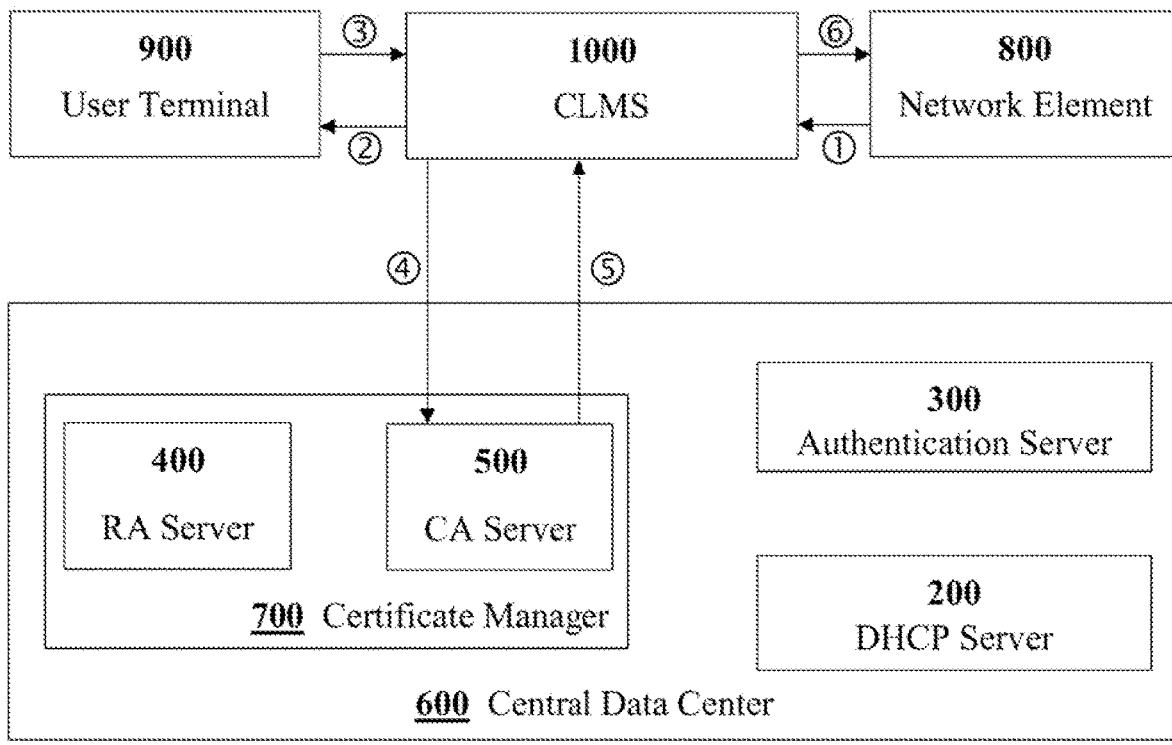
FIG. 8 is a diagram of a system architecture including a communication flow for performing semi-automated certificate enrollment for non-VM based network elements of a mobile communications network, according to one or more embodiments.

FIG. 8 is a diagram of a system architecture including a communication flow for performing semi-automated certificate enrollment for non-VM based network elements of a mobile communications network, according to one or more embodiments. The system illustrated in FIG. 8 includes the components for supporting fully-automated enrollment, described above with reference to FIGS. 1-6, in addition to the CLMS 1000. Thus, in the present embodiment, the system supports both fully-automated certificate enrollment and semi-automated certificate enrollment (e.g., as a backup or fallback enrollment where the fully-automated enrollment cannot be performed for a NE 800), though it is understood that one or more other embodiments are not limited thereto.

Referring to FIG. 8, at ①, the NE 800 generates and uploads a CSR to the CLMS 1000. For example, an authorized user (e.g., owner of the NE 800, system or network administrator, etc.) may select the CA server 500 from among plural available CA servers (e.g., CA servers such as intermediate CA servers for enrolling certificates based on NE device type) via a GUI of the CLMS, and the NE 800 may generate and upload the CSR to the CLMS 1000 for enrolling with the selected CA server. For example, a user (e.g., system administrator, management user, etc.) may utilize a user terminal to log in to or access the NE 800 remotely and generate and submit the CSR from the NE 800. Additionally or alternatively, instructions may be triggered (e.g., by a user directly to the NE 800, by a user remotely, or by occurrence of an event) to execute (e.g., automatically execute) to generate and submit the CSR to the CLMS 1000. For example, instructions or scripts installed in the NE 800 may automatically execute to generate and submit a CSR periodically or in response to an event (e.g., based on a renewal trigger point, such as X days until expiration, defined in the policy for an existing certificate enrolled by the NE 800).

At ②, the CLMS 1000 provides a GUI to the user terminal 900 through which a user (e.g., administrator) may approve or deny the CSR uploaded by the NE 800. At ③, the user terminal 900 submits an approval (or denial) of the CSR based on an input of the user.

At ④, the CLMS 100 sends the approved CSR to the selected CA server 500 via an API (e.g., REST API). The CA server 500 receives the CSR, determines a profile ID previously set for the CSR (or for the NE 800) and determines a corresponding policy that is previously configured as described above. Based on the CSR and the determined policy, the CA server 500 generates a certificate for the NE 800. At ⑤, the CA server 500 sends the certificate to the CLMS 1000 via the API. At ⑥, the certificate is downloaded by the NE 800.

Figure 9:
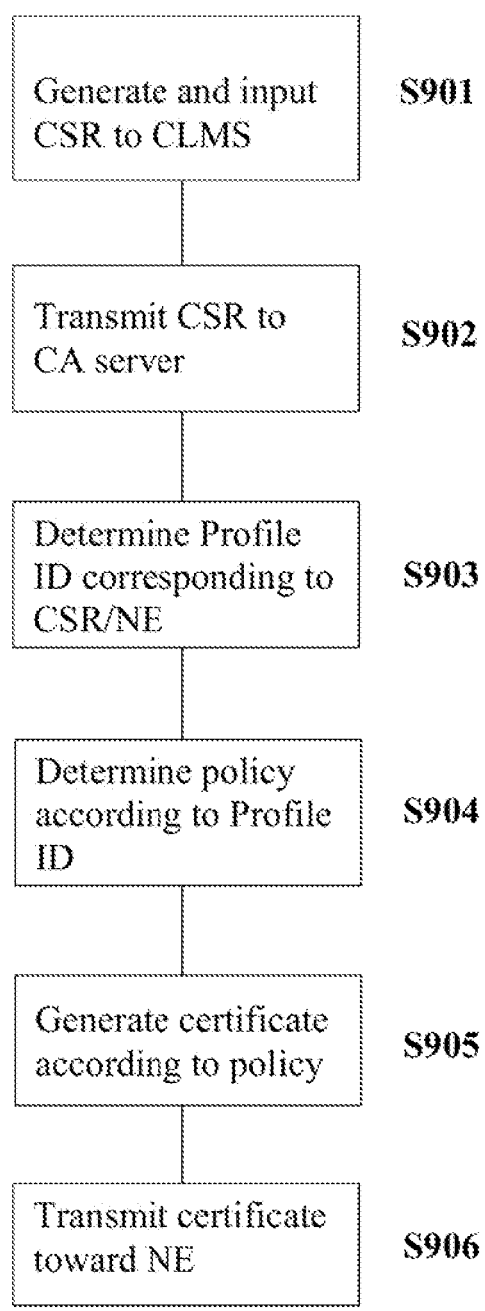
FIG. 9 is a flowchart of a method for performing semi-automated certificate enrollment for non-VM based network elements, according to one or more embodiments.

FIG. 9 is a flowchart of a method for performing semi-automated certificate enrollment for non-VM based network elements, according to one or more embodiments. The method of FIG. 9 may be performed by the system illustrated in FIG. 8 or 9.

Referring to FIG. 9, at operation S901, a CSR is generated and input to the CLMS 1000. For example, the CSR may be input by a user (e.g., owner of the NE 800 or system administrator) via a GUI of the CLMS 1000. Additionally, the user may select or input a particular CA server to which the CSR will be enrolled.

At operation S902, the CSR is sent from the CLMS 1000 to the CA server 500 via an API (e.g., REST API). According to an example embodiment, the CLMS 1000 may send the CSR to the CA server 500 upon at least one of approval by a user (e.g., system administrator) and successful compliance check (e.g., confirming that the CSR complies with a predetermined policy of the network operator).

At operation S903, the CA server 500 determines a preconfigured or set profile ID corresponding to the CSR (or to the NE 800). Here, the profile IDs may be manually assigned by a user (e.g., a system administrator) when there is a new device that is to be enrolled to the CA server 500. Specifically, when a new device is to be enrolled to the CA server 500 in order to obtain certificates, a user may assign a profile ID for that device and configure a corresponding policy for that device/profile ID in the CA server 500 (e.g., may define a validity period for a key usage, a key validity period, etc.). Accordingly, the CA server may store a list of profile IDs (i.e., previously set profile IDs), each of which corresponds to a specific NE (e.g., serial number) a specific type of NE, a vendor of an NE, etc. For example, a first ID or a first set of IDs (e.g., "6xxx") correspond to a first type of NE (e.g., RUs), a second ID or a second set of IDs (e.g., "7xxx") correspond to a second type of NE (e.g., STUs), etc.

At operation S904, the CA server 500 determines a preconfigured policy according to the profile ID. The policies include information for configuring or generating a certificate, such as at least one of a subject name format (C, O, CN fields), a key usage, an extended key usage, a validity period, etc. The policies may be defined based on NE type (e.g., a default or standard validity period for an RU may be 6 months, and a default or standard validity period for a non-RU device may be 3 years), though it is understood that one or more other embodiments are not limited thereto. The CA server 500 may determine the policy corresponding to the profile ID for the CSR, e.g., by determining a device type of the NE 100 according to the profile ID and the preconfigured policy based on the device type.

At operation S905, the CA server 500 generates the certificate in accordance with the determined policy. In this case, the generated certificate may include the key usage, validity period, etc., such that the certificate will only allow the NE 800 to perform the specified usage within the validity period.

At operation S906, the certificate is transmitted to the NE 800 via the CLMS. For example, the CA server 500 may send a notification to the CLMS to notify the user that the certificate is ready to be downloaded, and the user can then use the CLMS to download the certificate and install it in the NE 800.

While the above example embodiments are described with reference to certificate enrollment, it is understood that one, some, or all of the above-described embodiments are also applicable to certificate re-enrollment or renewal. The certificate re-enrollment or renewal may be triggered in one or more embodiments based on a current system date/time crossing a threshold, for example, determined in accordance with the below Equation:

$$\text{certificate issuance data+renewal} \\ \text{threshold*certificate validity period}$$

For example, using the above equation, if the certificate validity period is 100 days and the renewal threshold is 60%, the certificate renewal is triggered when the current system date reaches or crosses 60 days after the certificate issuance date. It is understood that one or more of the certificate validity period and renewal threshold are configurable by a user (e.g., system administrator) and may vary from one certificate to another, for one NE to another, for one NE device type to another, etc. Further, in one or more embodiments, an alarm or notification (e.g., "operator certificate is expiring in X days") may be generated by a device (e.g., the corresponding NE in which the certificate is enrolled, another NE connected to the NE, the CLMS, etc.) and updated daily (or periodically) until the alarm is cleared (e.g., upon successful renewal of the certificate).

Figure 10:
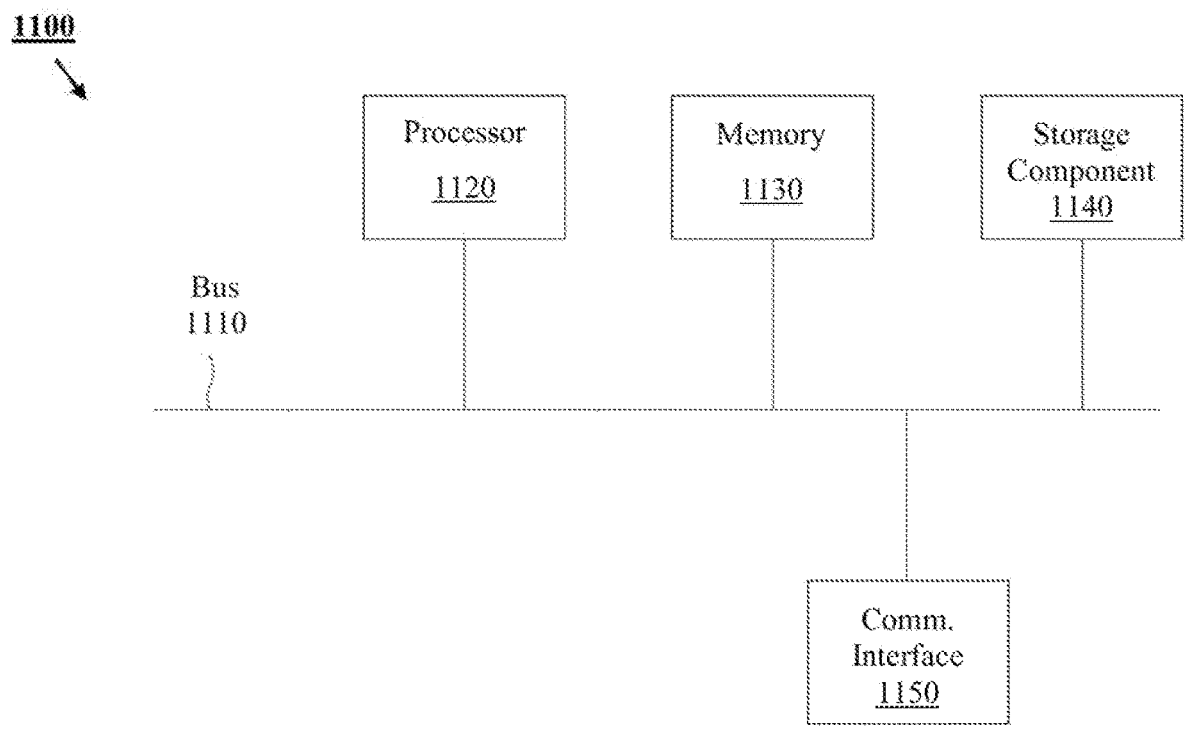
FIG. 10 is a diagram of components of one or more devices according to an embodiment.

FIG. 10 is a diagram of components of one or more devices according to an embodiment.

Device 1100 may correspond to any of the devices described above (e.g., network element 100 or 800, DHCP server 200, Authentication server 300, RA server 400, CA server 500, user terminal 900, CLMS 1000, etc.).

As shown in FIG. 10, the device 1100 may include a bus 1110, a processor 1120, a memory 1130, a storage component 1140, and a communication interface 1150. It is understood that one or more of the components may be omitted and/or one or more additional components may be included.

The bus 1110 includes a component that permits communication among the components of the device 1100. The processor 1120 is implemented in hardware, firmware, or a combination of hardware and software. The processor 1120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 1120 includes one or more processors capable of being programmed to perform a function.

The memory 1130 includes a random access memory (RAM), a read only memory (ROM), and/or another type of dynamic or static storage device (e.g., a flash memory, a magnetic memory, and/or an optical memory) that stores information and/or instructions for use by the processor 1120.

The storage component 1140 stores information and/or software related to the operation and use of the device 1100. For example, the storage component 1140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 1150 includes a transceiver-like component (e.g., a transceiver and/or a separate receiver and transmitter) that enables the device 900 to communicate with other devices, such as via a wired connection, a wireless connection, or a combination of wired and wireless connections. The communication interface 1150 may permit device 1100 to receive information from another device and/or provide information to another device. For example, the communication interface 1150 may include an Ethernet interface, an optical interface, a coaxial interface, an infrared interface, a radio frequency (RF) interface, a universal serial bus (USB) interface, a Wi-Fi interface, a cellular network interface, or the like.

The device 1100 may perform one or more processes described herein. The device 1100 may perform operations based on the processor 1120 executing software instructions stored by a non-transitory computer-readable medium, such as the memory 1130 and/or the storage component 1140. A computer-readable medium is defined herein as a non-transitory memory device. A memory device includes memory space within a single physical storage device or memory space spread across multiple physical storage devices.

Software instructions may be read into the memory 1130 and/or the storage component 1140 from another computer-readable medium or from another device via the communication interface 1150. When executed, software instructions stored in the memory 1130 and/or storage component 1140 may cause the processor 1120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for performing full-automated enrollment of certificates in a mobile communications network, the system comprising:
   a network element configured to request a certificate;
   at least one server configured to authenticate the network element and provide certificate authority (CA) information to the network element; and
   a certificate manager configured to obtain a preconfigured policy for the requested certificate, obtain the certificate based on the preconfigured policy, and issue the certificate to the network element,
   wherein the network element is configured to:
      send, to the at least one server, a request for obtaining information on the certificate manager;
      obtain, from the at least one server, the information on the certificate manager;
      send, to the certificate manager based on the obtained information on the certificate manager, a certificate signing request (CSR) for requesting the certificate; and
      receive, from the certificate manager, the requested certificate generated by a CA server of the certificate manager, and
   wherein the system further comprises a Certificate Lifecycle Management System (CLMS) configured to communicate with the CA server to perform semi-automated enrollment of certificates, wherein the semi-automated enrollment of certificates comprises a manual input by a user, via a graphical user interface (GUI) of the CLMS, with respect to another CSR generated by another network element and sent by the other network element to the CLMS for requesting another certificate for the other network element, the manual input made subsequent to the CLMS receiving the other CSR from the other network element and comprising at least one of a selection of the CA server from among a plurality of CA servers, an approval of the other CSR received by the CLMS, or a parameter of the other certificate.

2. The system as claimed in claim 1, wherein:
   the at least one server comprises a Dynamic Host Configuration Protocol (DHCP) server and an Authentication server; and
   the DHCP server is configured to:
      receive the request for obtaining information on the certificate manager, sent by the network element, the request including at least one security parameter;
      send the at least one security parameter to the Authentication server to perform an authentication of the network element;
      receive a result of the authentication from the Authentication server; and
      send, to the network element, the information on the certificate manager based on the result of the authentication indicating a successful authentication.

3. The system as claimed in claim 2, wherein:
   the at least one security parameter comprises a device certificate pre-installed at both the network element and the Authentication server; and
   the Authentication server is configured to perform the authentication by verifying, using the device certificate pre-installed therein, the device certificate included in the at least one security parameter.

4. The system as claimed in claim 3, wherein the device certificate is a vendor certificate issued by a CA of a vendor of the network element, and the Authentication server is configured to store a plurality of vendor certificates respectively issued by a plurality of CAs of vendors of network elements included in the mobile communications network.

5. The system as claimed in claim 1, wherein:
   the certificate manager comprises a Registration Authority (RA) server and the CA server;
   the RA server is configured to:
      receive the CSR sent by the network element and authenticate the network element,
      assign a predetermined profile identifier (ID) to the CSR, and
      send the CSR and the profile ID to the CA server; and
   the CA server is configured to:
      receive the CSR and the profile ID sent by the RA server;
      determine a preconfigured policy mapped to the profile ID; and
      generate the certificate according to the determined preconfigured policy.

6. The system as claimed in claim 5, wherein the information on the certificate manager comprises at least one of a fully qualified domain name (FQDN) and port of the CA server.

7. The system as claimed in claim 1, further comprising:
   the other network element configured to generate and input the other CSR to the CLMS, and download, via the CLMS, the other certificate generated by the CA server,
   wherein the CLMS is configured to:
      provide the GUI via which the CA server is selected from among the plurality of CA servers, and via which the other CSR is input;
      transmit the other CSR to the CA server;
      receive the other certificate generated by the CA server based on the transmitted other CSR; and
      allow the other certificate to be downloaded by the other network element.

8. The system as claimed in claim 7, wherein the CA server is configured to:
   receive the other CSR transmitted by the CLMS;
   determine a profile ID corresponding to the other CSR;
   determine a preconfigured policy mapped to the profile ID; and
   generate the other certificate based on the determined preconfigured policy.

9. The system as claimed in claim 1, wherein the semi-automated enrollment of certificates is provided by the system as an alternative to the full-automated enrollment of certificates when the full-automated enrollment of certificates cannot be performed for one or more network elements.

10. A method for performing full-automated enrollment of certificates in a mobile communications network, the method comprising:
- sending, by a network element to at least one server, a request for obtaining information on a certificate manager;
- obtaining, by the network element from the at least one server, the information on the certificate manager based on the network element being authenticated by the at least one server;
- sending, by the network element to the certificate manager based on the obtained information on the certificate manager, a certificate signing request (CSR) for requesting the certificate;
- receiving, by the network element from the certificate manager, the requested certificate generated by a CA server of the certificate manager based on a preconfigured policy obtained by the CA server for the requested certificate; and
- performing, by a Certificate Lifecycle Management System (CLMS) configured to communicate with the CA server, semi-automated enrollment of certificates, wherein the performing semi-automated enrollment of certificates comprises receiving a manual input from a user via a graphical user interface (GUI) of the CLMS, with respect to another CSR generated by another network element and sent by the other network element to the CLMS for requesting another certificate for the other network element, the manual input made subsequent to the CLMS receiving the other CSR from the other network element and comprising at least one of a selection of the CA server from among a plurality of CA servers, an approval of the other CSR received by the CLMS, or a parameter of the certificate.

11. The method as claimed in claim 10, further comprising:
- receiving, by a DHCP server among the at least one server, the request for obtaining information on the certificate manager, sent by the network element, the request including at least one security parameter;
- sending, by the DHCP server, the at least one security parameter to an Authentication server to perform an authentication of the network element;
- receiving, by the DHCP server, a result of the authentication from the Authentication server; and
- sending, by the DHCP server to the network element, the information on the certificate manager based on the result of the authentication indicating a successful authentication.

12. The method as claimed in claim 11, wherein:
the at least one security parameter comprises a device certificate pre-installed at both the network element and the Authentication server; and
the method further comprises performing, by the Authentication server, the authentication by verifying, using the device certificate pre-installed therein, the device certificate included in the at least one security parameter.

13. The method as claimed in claim 12, wherein the device certificate is a vendor certificate issued by a CA of a vendor of the network element, and the Authentication server is configured to store a plurality of vendor certificates respectively issued by a plurality of CAs of vendors of network elements included in the mobile communications network.

14. The method as claimed in claim 10, further comprising:
- receiving, by a Registration Authority (RA) server included in the certificate manager, the CSR sent by the network element and authenticating, by the RA server, the network element;
- assigning, by the RA server, a predetermined profile identifier (ID) to the CSR;
- sending, by the RA server, the CSR and the profile ID to the CA server;
- determining, by the CA server based on the CA server sent by the RA server, a preconfigured policy mapped to the profile ID; and
- generating, by the CA server, the certificate according to the determined preconfigured policy.

15. The method as claimed in claim 14, wherein the information on the certificate manager comprises at least one of a fully qualified domain name (FQDN) and port of the CA server.

16. The method as claimed in claim 10, further comprising:
- providing, by the CLMS, the GUI via which the CA server is selected from among the plurality of CA servers, and via which the other CSR is input;
- generating and inputting, by the other network element, the other CSR to the CLMS;
- transmitting, by the CLMS, the other CSR to the CA server;
- receiving, by the CLMS, the other certificate generated by the CA server based on the transmitted other CSR; and
- downloading, by the other network element, the other certificate from the CLMS.

17. The method as claimed in claim 16, further comprising:
- receiving, by the CA server, the other CSR transmitted by the CLMS;
- determining, by the CA server, a profile ID corresponding to the other CSR;
- determining, by the CA server, a preconfigured policy mapped to the profile ID; and
- generating, by the CA server, the other certificate based on the determined preconfigured policy.

18. A non-transitory computer-readable recording medium having recorded thereon instructions executable by at least one processor of a network element to cause the at least one processor to perform a method for full-automated enrollment of certificates in a mobile communications network, the method comprising:
- sending, to at least one server, a request for obtaining information on a certificate manager;
- obtaining, from the at least one server, the information on the certificate manager based on the network element being authenticated by the at least one server;
- sending, to the certificate manager based on the obtained information on the certificate manager, a certificate signing request (CSR) for requesting the certificate;
- receiving, from the certificate manager, the requested certificate generated by a CA server of the certificate manager based on a preconfigured policy obtained by the CA server for the requested;
- performing, by a Certificate Lifecycle Management System (CLMS) configured to communicate with the CA server, semi-automated enrollment of certificates, wherein the performing semi-automated enrollment of certificates comprises receiving a manual input from a user, via a graphical user interface (GUI) of the CLMS, with respect to another CSR generated by another network element and sent by the other network element to the CLMS for requesting another certificate for the other network element, the manual input made subsequent to the CLMS receiving the other CSR from the other network element and comprising at least one of a selection of the CA server from among a plurality of CA servers, an approval of the other CSR received by the CLMS, or a parameter of the certificate.

* * * * *